C. CISSNER.
MACHINE FOR SHOCKING GRAIN.
APPLICATION FILED FEB. 4, 1915.
1,195,442.
Patented Aug. 22, 1916.
8 SHEETS—SHEET 3.
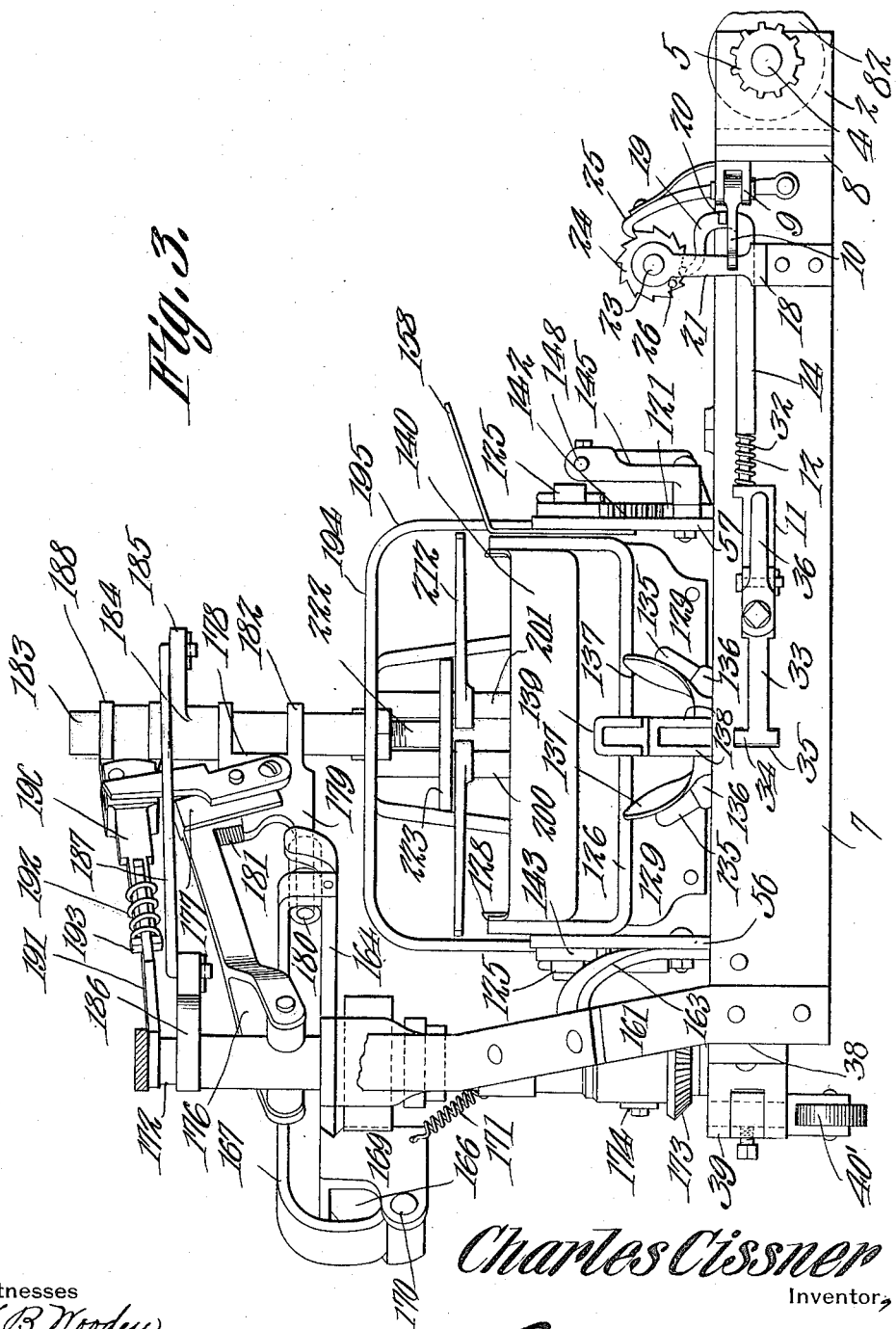
Witnesses
F. B. Wooden
Marian Moore
Charles Cissner
Inventor,
by C. A. Snow & Co.
Attorneys.

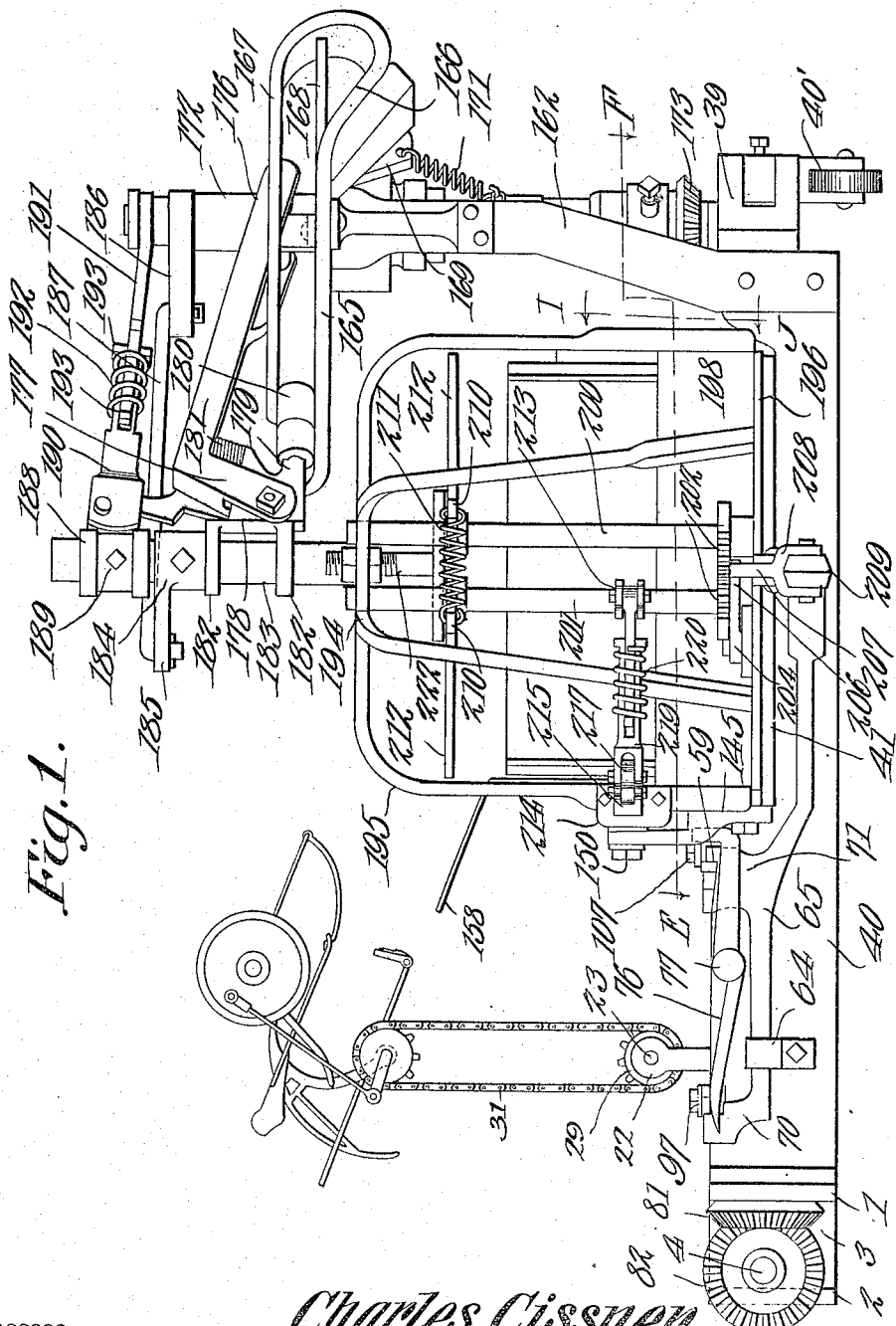

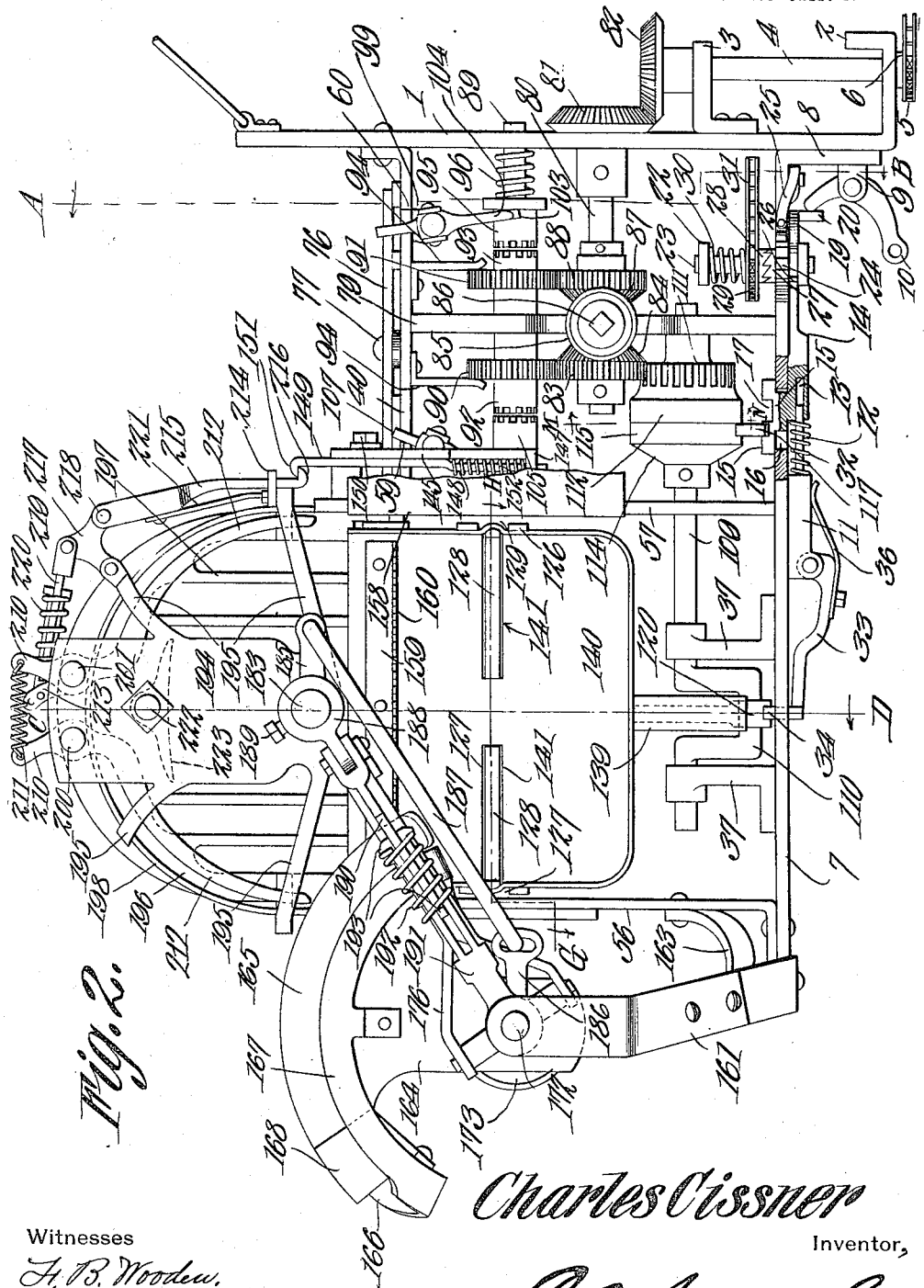

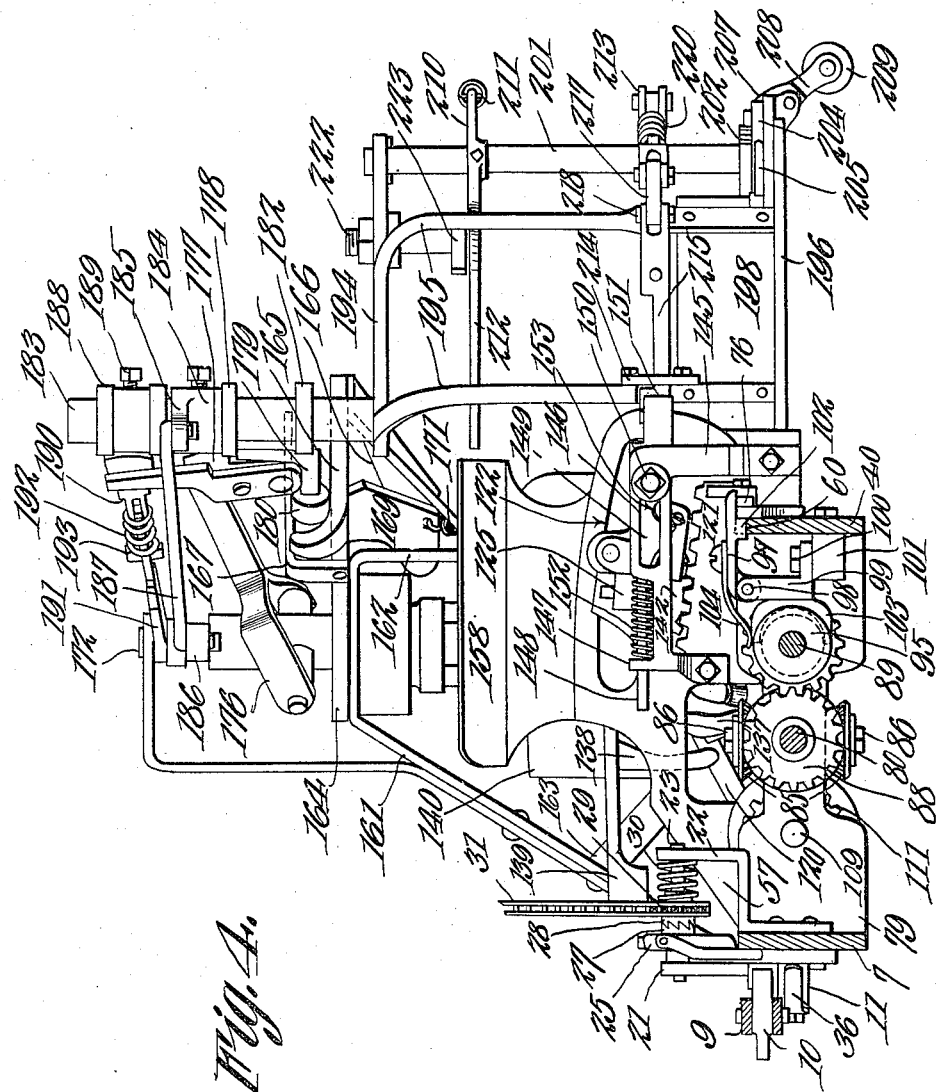

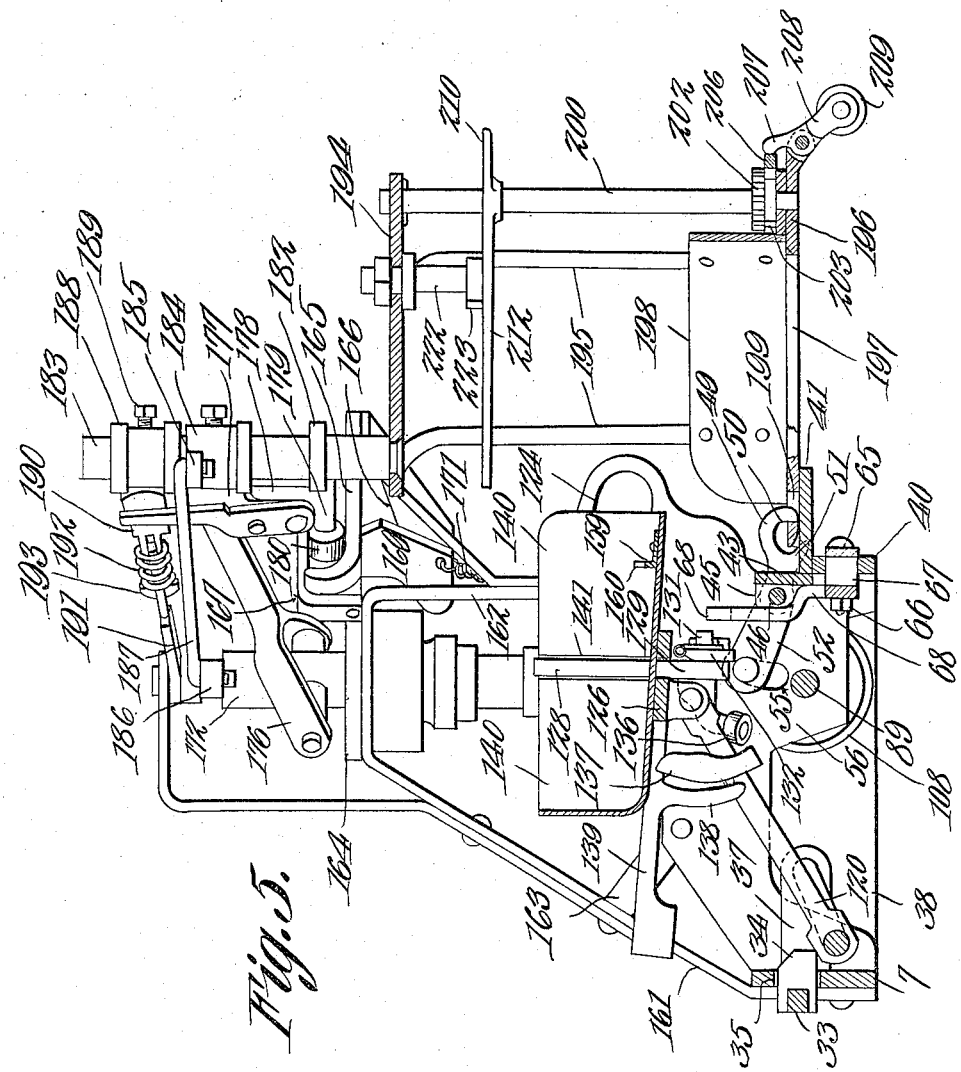

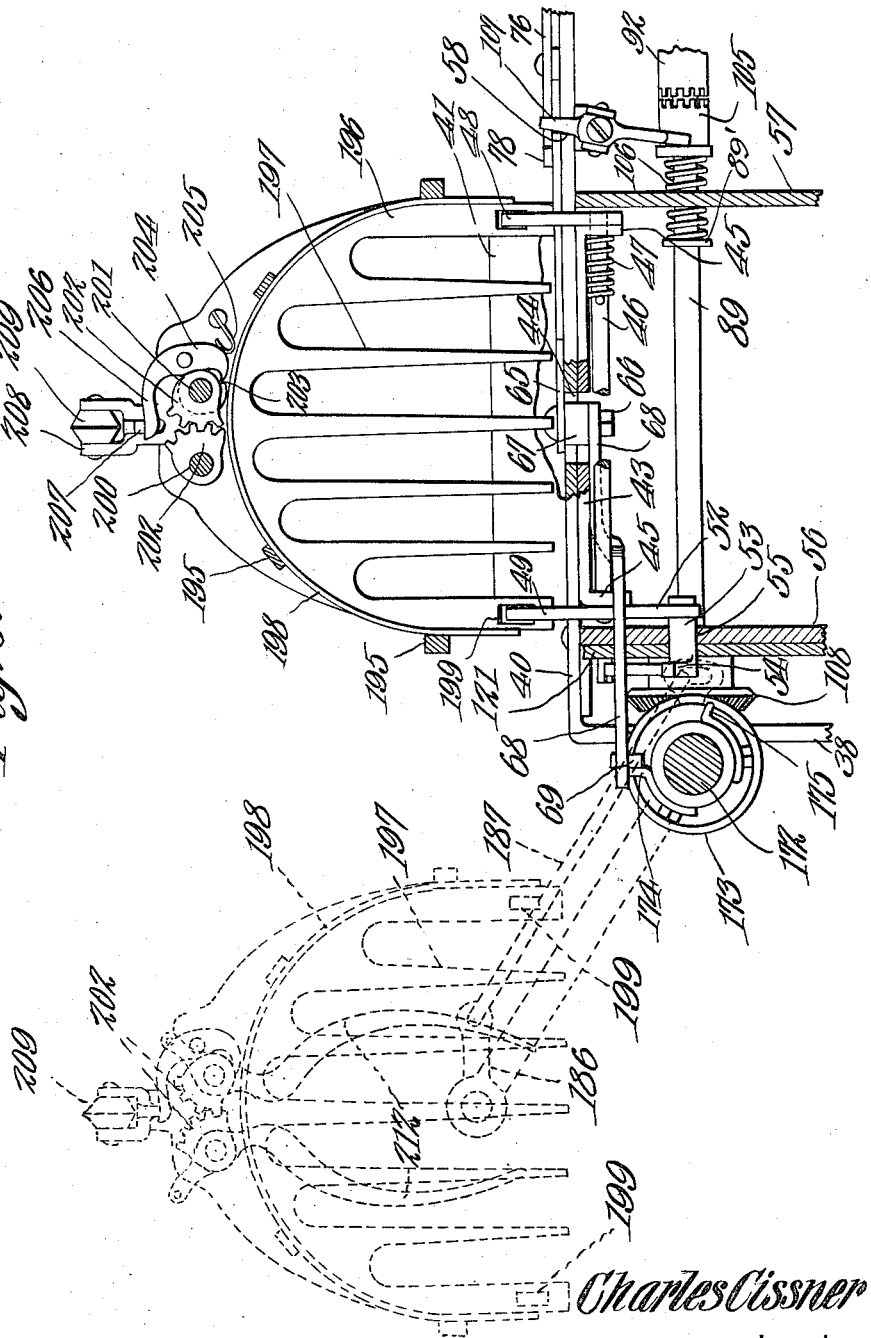

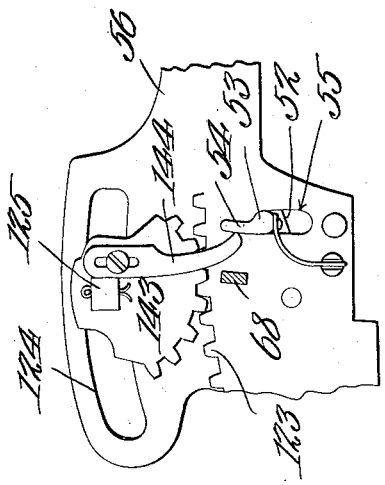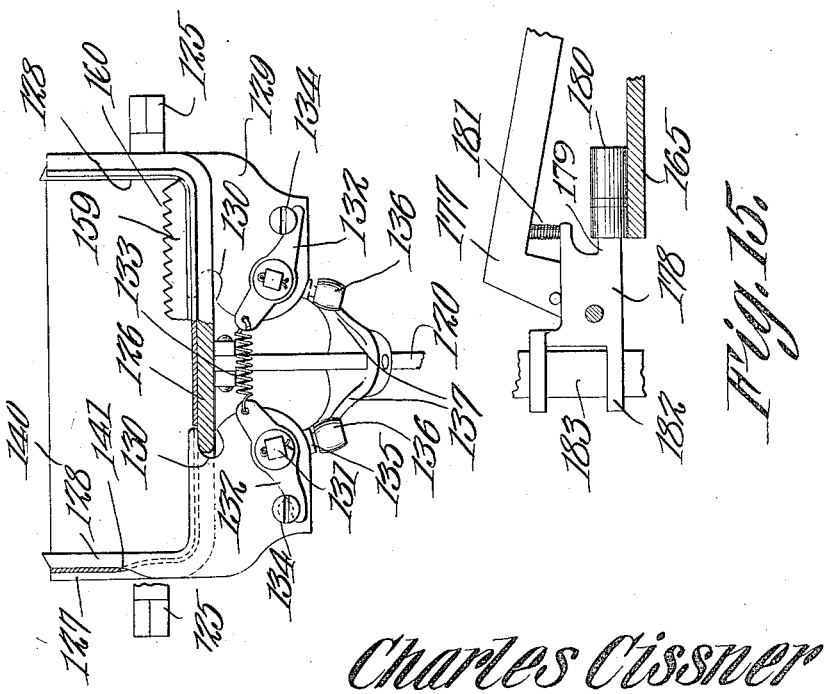

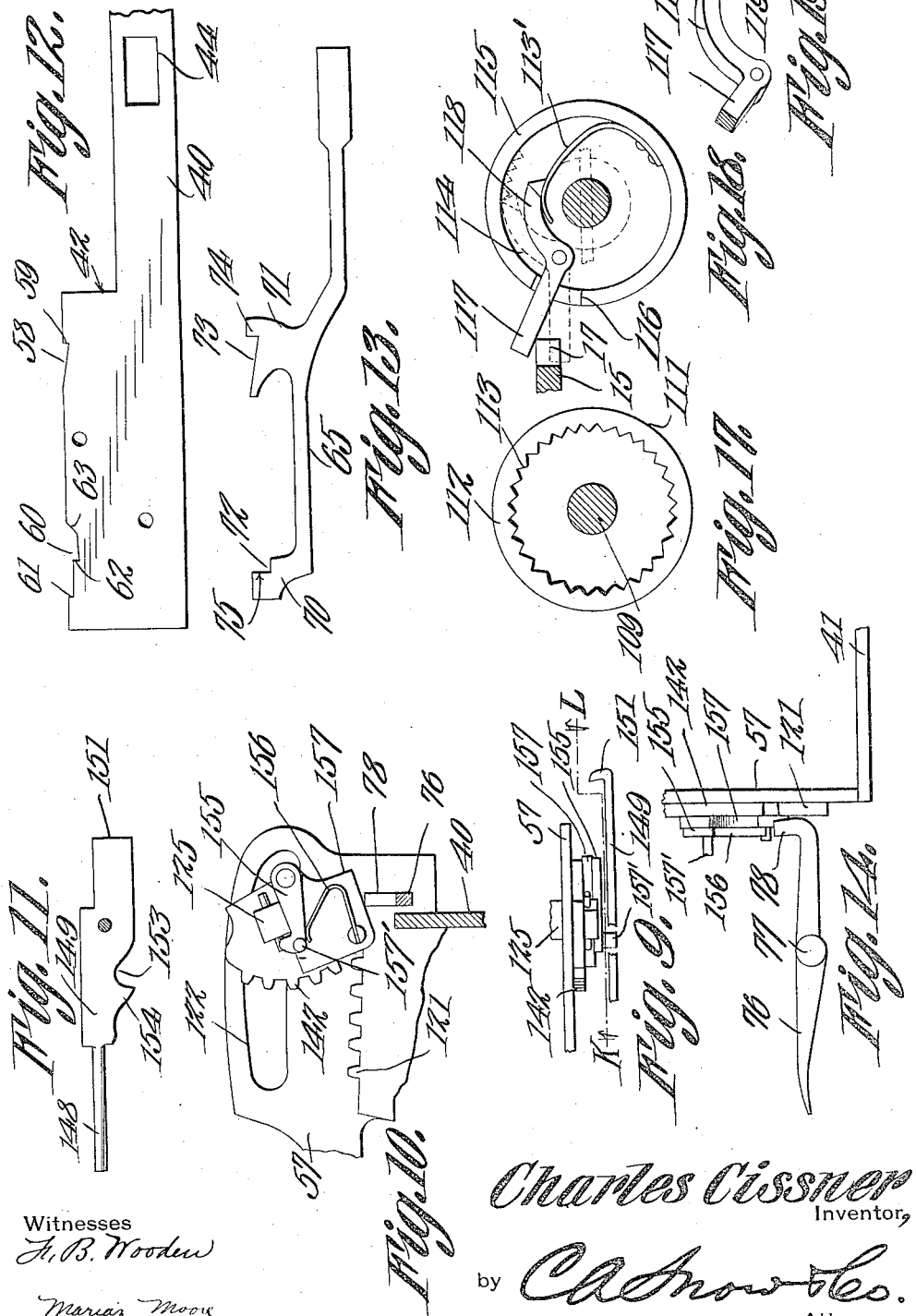

UNITED STATES PATENT OFFICE.

CHARLES CISSNER, OF STARKWEATHER, NORTH DAKOTA.

MACHINE FOR SHOCKING GRAIN.

1,195,442.  Specification of Letters Patent.  Patented Aug. 22, 1916.

Application filed February 4, 1915. Serial No. 6,114.

*To all whom it may concern:*

Be it known that I, CHARLES CISSNER, a citizen of the United States, residing at Starkweather, in the county of Ramsey and State of North Dakota, have invented a new and useful Machine for Shocking Grain, of which the following is a specification.

This invention relates to machines designed for use in connection with harvesting machines and is adapted to collect bundles or sheaves discharged from the harvester and form them into shocks which are subsequently left standing upon the ground.

One of the objects of the invention is to provide means whereby a predetermined number of bundles are collected before the shock forming mechanism is set into operation, means being provided whereby, when the desired number of bundles have been discharged into the machine, the means employed for gripping the bundles, and delivering them in upstanding positions to the shock former, and means for the delivery of the standing shock onto the ground will be operated in proper succession.

A further object is to provide means whereby the various parts of the mechanism will be returned automatically to their initial or set positions after the formation and delivery of a shock has been effected.

Another object is to provide novel means for collecting the bundles and delivering them to the shock former.

A further object is to provide a means for automatically gripping the bundles during their delivery to the former, so that they will not be displaced relative to each other and for subsequently automatically releasing the bundles after the delivery has been effected.

Another object is to provide a shock former of novel form having means for locking it against movement, said locking means being released automatically immediately after the delivery of the bundles to the shock former.

A further object is to provide means carried by the shock former for gripping the bundles until the shock former has been deposited on the ground whereby the bundles will be automatically released and the bottom of the shock former permitted to withdraw forwardly from under the shock which is thus left standing upon the ground.

A further object is to provide novel means for supporting and actuating the shock former.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawings, the preferred form of the invention has been shown.

In said drawings: Figure 1 is a front elevation of the machine and showing a portion of the bundle ejecting mechanism of a harvester. Fig. 2 is a plan view thereof. Fig. 3 is a rear elevation. Fig. 4 is a section on line A—B Fig. 2. Fig. 5 is a section on line C—D Fig. 2, certain parts being removed and other parts being shown in elevation. Fig. 6 is a section on line E—F Fig. 1, the delivery position of the shock former being indicated by dotted lines. Fig. 7 is a transverse section through the bundle collector, said section being taken on line G—H Fig. 2. Fig. 8 is a section on line I—J Fig. 1 and showing the unlocking means illustrated in plan in Fig. 2. Fig. 9 is a plan view of latching mechanism. Fig. 10 is a section on line K—L Fig. 9. Fig. 11 is a side elevation of the latching hooks. Fig. 12 is a front elevation of a portion of the front frame member of the machine. Fig. 13 is a front elevation of the shifting bar which coöperates with the front frame member. Fig. 14 is a front elevation of the clutch controlling lever and certain of the parts adjacent thereto. Fig. 15 is a side elevation of a portion of the carriage of the shock former, a portion of its supporting table being shown in section. Fig. 16 is a rear elevation of the outer end portion of the supporting table and showing the switch for guiding the carriage to the point where it is abruptly lowered to bring the platform into contact with the ground. Fig. 17 is a section on line M—N Fig. 2 looking in the direction indicated by the arrow. Fig. 18 is a section on line M—N Fig. 2 looking in the direction opposite to that indicated by the arrow. Fig. 19 is a perspective view of a portion of the lever shown in Fig. 18.

Referring to the figures by characters of reference 1 designates a beam constituting the inner side of the main frame of the machine, this beam being provided, at its rear end, with an out-standing arm 2 and, adjacent said arm, with an out-standing bracket 3. The beam 1 is adapted to be connected in any suitable manner to the delivery side of a harvester. A shaft 4 is journaled in the bracket 3 and the arm 2 and has a sprocket 5 at one end adapted to be driven, through a chain 6, from the harvester so that said shaft 4 is thus continuously rotated during the forward movement of the harvester.

The rear beam of the main frame has been indicated at 7 and is provided, at its inner end, with a rearwardly extended portion 8 bolted or otherwise secured to the frame 1 and carrying a bracket 9 on which is mounted a tripping lever 10 adapted to be operated manually whenever it is desired to actuate the shock forming mechanism without depending upon the automatically operated means provided for that purpose which will be hereinafter described.

A block 11 is secured on or formed with the beam 7 and has a stem 12 projecting from one end thereof and into a socket 13 formed in one end of a slidable latch bar 14. This latch bar is provided, at one end, with a head 15 slidable within a longitudinal slot 16 in the beam 7, said head projecting inwardly beyond the front face of the beam 7 and being formed with an intermediate notch 17. The other end portion of the latch bar 14 slides upon a bracket 18 and has an upwardly crooked terminal arm 19. A lug 20 extends rearwardly from this crooked arm and into the path of the inner or forward end of the lever 10.

A standard 21 projects upwardly from the bracket 18 and journaled in this standard and also in a bracket 22 extending forwardly from the beam 7 is a shaft 23 to which is secured a ratchet wheel 24. This ratchet wheel is normally engaged by a spring pressed pawl 25 which thus holds the ratchet wheel against rotation in one direction. A tripping pin 26 extends rearwardly from the ratchet wheel 24 and is adapted, once during each rotation of said ratchet wheel, to engage the terminal of the crooked arm 19, thus to shift said arm longitudinally of the beam 7 and to produce a corresponding movement of the latch bar 14. The forward side of the ratchet wheel 24 is provided with a clutch member 27 which is normally engaged by another clutch member 28 carried by a sprocket 29 loosely mounted on the shaft 23. A spring 30 is mounted on shaft 23 and bears at one end against the bracket 22 and at its other end against the sprocket 29 so that the two clutch members 27 and 28 are thus held normally in engagement with each other. The sprocket 29 is engaged by a chain 31 adapted to be attached to the bundle ejecting mechanism X of a harvester so that, each time a bundle is ejected from the harvester in any well known manner, the sprocket 29 will be given a partial back and forth rotation. In other words when a bundle is kicked from the harvester X by the usual well known mechanism, sprocket 29 will be operated to rotate the ratchet wheel 24 in one direction to cause one tooth of said ratchet wheel to slip under the pawl 25 after which the sprocket 29 will be rotated back to its initial position, the clutch member 28, during this operation, slipping over the clutch member 27. Thus it will be seen that successive ejection of bundles from a harvester will result in the intermittent rotation of the ratchet wheel 24 in one direction and, after this ratchet wheel has completed one rotation, the pin 26 will come against the arm 19 as hereinbefore stated and shift said arm and the latch bar 14 longitudinally. A spring 32 is mounted on the stem 12 and bears at one end against the block 11 and at its other end against the latch bar 14 and this spring 32 is placed under compression while the latch bar 14 is being shifted by pin 26 and, when said pin 26 is moved out of engagement with the crooked arm 19, the said spring 32 will return the latch bar to its initial position.

Pivotally connected to the block 11 is a latch lever 33 having a beveled head 34, as shown particularly in Fig. 5, this head projecting loosely through a slot 35 in the beam 7. A spring 36 is secured to the lever 33 and bears against block 11 so as thus to hold the head 34 normally projected forwardly beyond the front face of the beam 7. This head is located between forwardly extending brackets 37 secured to the beam 7 and provided for the purpose hereinafter set forth.

The outer side of the beam 7 is bolted or otherwise secured to the outer side beam 38 of the main frame, this beam 38 being provided, adjacent its front end, with a laterally extended bearing block 39 in which a caster 40' may be mounted.

The front end of the outer side beam 38 is formed with or secured to the front beam 40 of the main frame, this front beam being connected to the side beam 1 near the front thereof, as shown particularly in Fig. 2. A forwardly extending supporting ledge 41 is secured upon the beam 40 adjacent the outer end thereof and extends into an upwardly extending shoulder 42 formed upon said beam 40. This ledge is provided with an upstanding flange 43 extending throughout the length of the rear edge thereof and formed in the beam 40 under the ledge 41 is a longitudinal slot 44.

Ears 45 are extended rearwardly from the end portions of the flange 43 and constitute bearings for a shaft 46. A spring 47 is secured at one end to the shaft 46 and at its other end to one of the ears 45 and is adapted to be placed under stress when the said shaft is rotated in one direction.

A latch 48 is secured to one end of the shaft 46 so as to rotate therewith, this latch extending forwardly beyond the beam 40. Another latch 49 is secured to the other end of said shaft 46, both of these latches 48 and 49 having downwardly extending hooks 50 and forwardly extending fingers 51, the fingers being spaced from and disposed below the hooks. Latch 49 has a rearwardly extending arm 52 and extending laterally from this arm is a stud 53 provided with an upwardly extending finger 54. Said stud 53 is mounted to work upwardly and downwardly within a slot 55 formed in a guide plate 56 which is secured at its front and rear ends to the front beam 40 and the rear beam 7 respectively. This plate 56 is parallel with the beam 38 and also with another connecting plate 57 which is secured at its front and rear ends to the beams 40 and 7 respectively, the ledge 41 and its flange 43 being interposed between these plates 56 and 57.

As shown particularly in Fig. 12, that portion of the front beam 40 located between the shoulder 42 or plate 57 and the inner side beam 1 is provided, in its upper edge, and adjacent said shoulder 42, with a notch 58 forming a shoulder 59 at that end of the notch nearest the shoulder 42 while the bottom of the notch is inclined upwardly away from said shoulder 59.

A stepped recess 60 is formed in the upper edge of the beam 40 near the beam 1 and forms an upper shoulder 61 and a lower shoulder 62, one end wall of the recess 60 being inclined upwardly and outwardly to form a shoulder 63.

A bracket 64 is secured upon the beam 40 and slidably mounted therein is an actuating bar 65 the outer end of which extends partly or entirely across the slot 44 and is connected by a bolt 66 to a sleeve 67 adapted to work within the slot. This bolt 66 is also pivotally engaged by a bar 68 which is extended laterally through the connecting plate 56 and over the side beam 38. This bar 68 is provided, near its free end, with a rearwardly extending lug 69 for the purpose hereinafter set forth.

The bar 65 is provided with spaced heads 70 and 71 adapted to move across the recesses or notches 60 and 58 respectively. Head 70 is provided with a notch 72 the bottom of which lies in substantially the same horizontal plane with the bottom of the recess 60. Head 71 has a recess 73 forming a shoulder 74 at one end, the bottom of this notch or recess 73 being inclined upwardly toward the beam 1 of the main frame. Notch 73 extends downwardly to or below the bottom of the notch 58 and both the shoulder 74 and the shoulder 75 which is formed at the inner side of the notch 72, extend above the upper edge of the beam 40.

A lifting lever 76 is fulcrumed, as at 77, upon the beam 40, the heads of the bar 65 being arranged to work between this lever and the beam 40. The inner end of lever 76 is rounded and extends across the rod 60 while the other end of the lever extends across and normally below the notch 58 and has an up-turned finger 78 as shown particularly in Fig. 14.

A connecting beam 79 is interposed between and secured to the beams 7 and 40 and is located between the beam 1 and the connecting plate 57. A shaft 80 is journaled in this beam 79 and in the side beam 1 and has a gear 81 secured to it and meshing with another gear 82 secured to the shaft 4 so that motion is thus transmitted from the shaft 4 to the shaft 80. A gear 83 is fixedly connected to the shaft 80 and is provided with an integral bevel gear 84 constantly meshing with opposed bevel gears 85 mounted loosely upon studs 86 extending upwardly and downwardly from the beam 79. These bevel gears 85 mesh with opposed portions of the bevel gear 87 which is loosely mounted on the shaft 80 and is formed with or secured to a gear 88 likewise loosely mounted on said shaft 80. Thus it will be seen that when the shaft 80 is rotated gears 83 and 84 will move therewith and motion will be transmitted from the gear 84 through the gears 85 to the bevel gear 87 and gear 88.

A counter shaft 89 is journaled in the beams 1 and 79 and in the connecting plate 57 and is located between the front beam 40 and the shaft 80. This counter shaft has gears 90 and 91 loosely mounted thereon, the gear 90 constantly meshing with the gear 83 and the gear 91 constantly meshing with the gear 88. These gears 90 and 91 are located at opposite sides of the beam 79 and gear 90 has an integral clutch member 92 while gear 91 has an integral clutch member 93. Any suitable means, such as retaining fingers 94, can be provided for holding the gears 90 and 91 against movement away from the beam 79.

Slidably mounted on the shaft 89 but revoluble therewith is a clutch member 95 located between gear 91 and the beam 1, and a spring 96 is mounted on shaft 89 and bears against the clutch member 95 so as to shift it automatically into engagement with the clutch member 93. For the purpose of holding the clutch member 95 out of engagement with clutch member 93, a novel form of throwing lever 97 is provided. As shown particularly in Fig. 4 this lever is fulcrumed at 98 upon a bracket 99 swiveled, as at 100, upon a block 101 extending inwardly from the beam 40. This lever 97 bears downwardly upon the beam 40 and has a lug 102 adapted normally to rest within the recess 60 and to bear laterally against the shoulder 62. When the lug is thus positioned it also extends downwardly into the notch 72 and bears laterally against the shoulder 75 on the actuating bar 65. The bracket 99 has a rearwardly extending yoke 103 which engages the clutch member 95 so that, when lug 102 is in engagement with the shoulder 62, the clutch member 95 will be held pressed laterally out of engagement with the clutch member 93, as shown in Fig. 2. A spring 104 is secured on the lever 97 and bears downwardly on the yoke 103 and thus operates to press the lug 102 downwardly into the recess 60. When the parts are thus positioned, the forward end of the lever 97 extends over the rounded end of the lifting lever 76.

A clutch member 105 is feathered on the shaft 89 and is adapted to move into and out of engagement with the clutch member 92. A spring 106 is arranged on the shaft 89 and bears at one end against a collar 89' on said shaft (see Fig. 6) and at its other end against the clutch member 105 so as thus to shift said clutch member 105 normally into engagement with the clutch member 92. For the purpose of moving the clutch member 105 into and out of engagement with the clutch member 92, a shifting lever 107 is employed. This shifting lever is of the same construction as the lever 97 hereinbefore described and is adapted, while holding clutch member 105 out of engagement with the clutch member 92, to be seated within the notch 58 and against shoulder 59 and also within the notch 73 and against the shoulder 74. Thus it will be seen that when the various parts are set, both of the shiftable clutch members 95 and 105 are held out of engagement with the clutch members 93 and 92 and, consequently, the gears 90 and 91 are capable of rotating freely during the actuation of the shaft 80 without causing shaft 89 to rotate. When, however, the clutch member 95 is released from the restraining influence of the lever 97, the clutch member 95 is moved into engagement with clutch member 93 and thus couples gear 91 to shaft 89 so that said shaft will be rotated in one direction. Should the other clutch member 105 be released instead of the clutch member 95, the other gear 90 would be coupled to shaft 89 and said shaft caused to rotate in the opposite direction. However, as before stated, both of the gears 90 and 91 are normally un-coupled from their shafts. As shown particularly in Fig. 6, the shaft 89 extends transversely of the machine and through the plate 56, the outer end of said shaft 89 being provided with a bevel gear 108 for the purpose hereinafter set forth.

Journaled within the beam 79, connecting plate 57 and brackets 37 is a counter shaft 109 having a crank 110 located between the brackets 37. A gear 111 is mounted for rotation on the shaft 109 and constantly meshes with the gear 83. This gear 111 is formed with a circular flange 112 extending from one side thereof, the inner surface of the flange being formed with teeth 113. A disk 114 is secured to the shaft 109 so as to rotate therewith and has a circular flange 115 a portion of which is cut away as at 116 to provide a space in which a lever 117 is free to swing. This lever is fulcrumed upon that side of the disk 114 nearest the gear 111 and has an arm 118 provided with a laterally extending tooth 119 adapted to project toward the gear 111 and into the space surrounded by the flange 112. A spring 113' bears outwardly against the arm 118 and serves to press the tooth 119 outwardly into engagement with certain of the teeth 113 on the flange 112. The lever 117 is designed normally to bear downwardly upon the head 15, as shown in Fig. 2 so as to thus hold the tooth 119 out of engagement with the teeth 113 and the spring 113' under tension. Lever 117 is held in this disengaged position by the head 34 which engages one end of a pitman 120 mounted on the crank 110. In other words the crank 110 and the disk 114 are so positioned on the shaft 109 that, when lever 113 has been pressed downwardly on head 15 so as thus to disengage tooth 119 from teeth 113, head 34 will extend over the end of pitman 120 so as thus to prevent upward swinging of the crank 110. Consequently the gear 111 will be held uncoupled from the disk 114 and will be free to rotate independently thereof and of the shaft 109. Consequently, under ordinary conditions shaft 80 is free to rotate without causing the rotation of shaft 109 and the parts connected thereto. When, however, the head 15 is shifted by bar 14 either under the action of lever 10 or of the pin 26, the notch 17 in the head will be brought under lever 117 and said lever will be free to spring downwardly through the notch. Consequently the tooth 119 will move into engagement with the teeth 113 and the gear 111 will thus be coupled to disk 114. This will result in motion being transmitted from gear 83 through gear 111 to the shaft 109 and the crank 110 will thus be caused to swing downwardly and forwardly away from the head 34.

Secured to that side of plate 57 nearest the beam 1 is a rack 121 and formed within the plate 57 and above the rack is an arcuate slot 122. The connecting plate 56 has a rack 123 secured to the outer side thereof, and formed within this plate 56 and above the rack is an arcuate slot 124 similar to and directly opposite the slot 122. Movably mounted within the slots 122 and 124 are trunnions 125 extending laterally from a yoke 126 the sides of which are provided with slots 127 extending inwardly within the bottom of the yoke. Mounted in each of the slots 127 is an angular gripping arm 128, which, when in its normal position, conforms with the interior contour of the yoke. The base portion of each of the gripping arms 128 is enlarged to form a downwardly extending wing 129 and the inner end of each wing has a rounded recess 130 into which projects the inner end wall of the slot 127 in which the arm 128 is seated. A pin 131 is mounted for rotation in each wing and has a lever 132 secured thereto. The upwardly extending arms of the two levers 132 are connected by a coiled spring 133 which thus serves to hold the other or lower arms of the levers 132 pressed against stop pins 134 and also to draw the wings 129 toward each other so that the walls of the recesses 130 will bind upon the inner end walls of the slots 127. Each pin 131 has a downwardly extending finger 135 carrying a roller 136, these fingers being limited in their outward swinging movement by the stop pins 134 in the paths of the levers 132 but being capable of swinging inwardly toward each other against the action of the spring 133.

The pitman 120 hereinbefore referred to is connected to the middle portion of the yoke 126 and has upwardly diverging deflecting wings 137 fixedly connected to it. These wings are so positioned, that, when the pitman 120 is moved upwardly by the rotating crank 110, thus tilting the yoke 126, the wings 137 will enter between the rollers 136 and act as a wedge for swinging said rollers apart. Consequently, the arms 128 will be swung upwardly and inwardly about their points of engagement with the inner end walls of the slots 127 and against the action of the spring 133. When, however, the ends of the spreading or deflecting wings 137 have passed from between the rollers 136, the spring 133 will draw the arms back to their initial positions and the rollers 136 will, during the downward and backward movement of the yoke to its initial position, pass between the wings 137. This movement is permitted in view of the fact that the pins 131 will rotate and cause the levers 132 to swing downwardly away from the stops 134 and against the action of the spring 133.

For the purpose of steadying the yoke while in its normal or load receiving position, holding arms 138 may be extended downwardly from an arm 139 extending rearwardly from the yoke 126. These arms are adapted to straddle the pitman 120 when the yoke is in its normal position, as shown in Fig. 5.

Secured within and upon the yoke 126 and movable therewith is a box like bundle receiver 140 open at its top and at its front end and provided in its sides and bottom with slots 141 corresponding with the slots 127 in the yoke and through which the arms 128 are adapted to move.

Secured to the sides of the yoke 126 are segmental racks 142 and 143, the rack 142 bearing downwardly on and meshing with the rack 121 while the rack 143 bears downwardly on and meshes with the rack 123. Thus it will be seen that when the pitman 120 is actuated to swing the yoke 126 and the bundle receiver upwardly and forwardly, the segmental racks 142 and 143 will travel forwardly upon the racks 121 and 123 while the trunnions 125 will likewise travel forwardly within the slots 122 and 124.

Secured to the rack 143 so as to move therewith is a tripping finger 144 which, as shown in Fig. 8, can be adjustably mounted. This tripping finger is adapted, during the forward movement of the rack 143, to strike against the finger 54 and thus deflect it and cause the arm 52 of latch 49 to swing downwardly and to cause the shaft 46 to rotate against the action of the spring 47. This operation is for the purpose hereinafter set forth.

Secured to the inner side of and upstanding from the rack 121 is a bracket 145 having a longitudinally extending slot 146, there being a laterally extending ear 147 at the rear end of the bracket and constituting a guide for a stem 148. This stem projects rearwardly from a slide 149 and a stud 150 is extended laterally from the slide and works within the slot 146. The forward end of this slide is provided with a hook 151 and this hook is held normally projected forwardly by a coiled spring 152 mounted on the stem 148 and bearing at one end against the slide 149 and at its other end against the ear 147. A notch 153 is formed in the lower edge of the slide 149 and a ratchet tooth 154 is located at the rear end of the notch 153.

Pivotally mounted upon the segmental rack 142 is a dog 155 and a spring 156 serves to press the dog yieldingly against the adjacent trunnion 125. A lug 157' extends laterally from the dog 155 and projects under the slide 149.

When the trunnion 125 of the yoke 126 moves forwardly within slot 122 as hereinbefore described, the lug 157' will ride along the lower edge of slide 149 and will spring past the tooth 154 and into the notch 153. During the return or back movement of the segmental rack 142 along the rack 121 the lug 157' will push against the tooth 154 and thus cause the slide 149 to move rearwardly against the action of its spring 152 until just before the rack 142 reaches the rear limit of its movement whereupon stud 157' will pass under the tooth 154 and the spring 152 will shift the slide 149 forwardly automatically until stud 150 comes against the forward end wall of the slot 146.

As shown particularly in Fig. 10 the segmental rack 142 is provided with a cam like extension 157 located above the upturned finger 78 of the lifting lever 76. This extension 157 is designed, during the completion of the forward movement of the segmental rack 142, to press downwardly on the finger 78 and actuate lever 76 for the purpose hereinafter set forth.

An inclined board 158 extends downwardly to a point close to one side of the bundle collector 140 and is supported preferably by the connecting plate 57. This board is adapted to direct bundles from a harvesting machine into the collector 140. For the purpose of preventing bundles from slipping out of the collector prematurely, a retaining strip 159 is extended across the bottom of the bundle collector 140 close to the delivery end thereof, this strip having upstanding teeth 160.

Upstanding from the outer ends of the beams 7 and 40 of the main frame are supports 161 and 162 connected at their upper ends and provided with suitable braces such as indicated at 163. Fixedly mounted on the supports is a table 164 extending forwardly and provided, at its front, with a segmental bearing or track portion 165. The outer end of this track portion is inclined downwardly, as shown at 166 and extending upwardly from the lower end of this downwardly inclined portion 166 and thence longitudinally above the track portion 165 is a retaining strip or guide 167. A switch plate 168 overhangs a part of the inclined portion 166 and has a side wing 169 extending back of the track or bearing portion 165 and pivotally connected at 170 to the lower end of the inclined portion 166. A spring 171 is connected to the wing 169 and to the support 162 and serves to hold one end of the switch plate 168 normally pressed against the upper end of the inclined portion 166 so that the said switch plate 168 is thus normally disposed with its upper face flush with the upper face of the bearing portion 165.

A post 172 is journaled at its lower end within the bearing block 39 and, at an intermediate point, within the table 164. This post is provided, adjacent its lower end, with a gear 173 constantly in mesh with the gear 108. Shifting plates 174 and 175 are secured to opposed portions of the post 172 and the stud 69 on bar 68 projects between the active ends of these plates and is adapted to be shifted successively by the plates. In other words, during the rotation of the post 172 in one direction, the plate 174 will move against stud 69 and shift bar 68 in one direction whereas, during the rotation of the post 172 in the opposite direction, the plate 175 will engage the stud 69 and shift the bar 68 in the opposite direction.

A yoke 176 straddles, and is pivotally connected to the post 172 above the table 164 and this yoke extends forwardly and overhangs the guide or retaining rail or bar 167. This yoke 176 has a depending fork 177 in which a carriage 178 is pivotally mounted. A stem 179 extends rearwardly from the carriage and rollers 180 are mounted on the stem and are adapted to travel along the bearing or track portion 165 of the table and under the retaining bar or rail 167. A cushioning spring 181 is interposed between the yoke 176 and the rear end of the upper portion of the carriage 178 while superposed bearing members 182 extend forwardly from the carriage.

Mounted for rotation within the bearing members 182 is a stem 183 and secured to this stem and bearing downwardly on the upper member 182 is a collar 184 provided with a radial arm 185. Another arm 186 is fixedly mounted adjacent the upper end of the post 172 and these arms 185 and 186 are connected by a rod 187 which serves to maintain the arms 185 and 186 constantly parallel.

The upper end portion of the stem 183 is mounted for rotation within a forked block 188, there being a collar 189 secured to the stem 183 between the members of the fork. This forked block 188 is pivotally engaged by one end of a cushioning member 190 which straddles, and slidably engages, another cushioning member 191 loosely mounted adjacent the upper end of the post 172. A coiled spring 192 extends around the interfitting portions of the members 190 and 191 and serves as a means for retarding the movement of the member 190 away from the member 191, these members 190 and 191 being provided with outstanding lugs 193 which bear against the ends of the spring. Thus it will be seen that spring 192 assists the spring 181 in keeping the stem 183 substantially vertical under normal conditions.

Secured to the lower end of the stem 183 so as to rotate therewith is the top plate 194 of the shock former. This top plate has side strips extending outwardly and downwardly therefrom as shown at 195 and which are attached at their lower ends to the arcuate base strip 196 of the shock former. Tines 197 are formed with or secured to the arcuate base strip 196 and are disposed substantially parallel with each other, these tines being extended rearwardly at all times. The ends of the tines are disposed in line with the ends of the arcuate strip 196 and upstanding from the outer side of the said arcuate strip 196 and supported by said strip is an arcuate shield 198 formed of sheet metal or other suitable material, this shield being secured to the depending side strips or hangers 195. Openings 199 are formed in the end portions of the base strip 196 and when the shock former is in its normal position with its tines resting on the ledge 41 directly in front of the bundle receiver 140, the hooks 50 upon the forward ends of the latches 48 and 49 are seated within these openings 199, thus fastening the shock former to the front beam 40 of the main frame.

Journaled within the forward portion of the base strip 196 and within the forward portion of the top plate 194 are parallel vertical shafts 200 and 201 provided, near their lower ends, with meshing gears 202 so that the two shafts are always caused to rotate in opposite directions respectively. The gears employed are preferably mutilated gears and under one of these gears is a ratchet wheel 203 normally engaged by a pawl 204, a spring 205 being provided for holding the pawl yieldingly in engagement with the ratchet wheel. Said pawl has an arm 206 extending laterally therefrom and in front of the shafts 200 and 201 and also back of the upwardly extending arm 207 of a bell crank lever 208. This bell crank lever is pivotally connected to the front extremity of the base strip 196 and carries a roller 209 upon its lower arm, designed, when the shock former is lowered, to come into contact with the ground. Thus, in lowering the shock former, the bell crank lever 208 will shift the arm 206 so as to cause the pawl 204 to become disengaged from the ratchet tooth 203.

Extending forwardly from the shafts 200 and 201 are arms 210 connected by a spring 211 which thus serves to hold said arms normally drawn toward each other. Arcuate gripping arms 212 are connected to the respective shafts 200 and 201 and the spring 211 serves to hold these arms 212 pressed yieldingly against the side strips or hangers 195. When they are thus positioned, however, the ratchet wheel 203 is not in engagement with pawl 204.

Extending forwardly from the shaft 201 is an arm 213 and slidably mounted in a bracket 214 secured to one side of the shock former is a bar 215 having a hooked terminal 216 adapted, when the shock former is in its normal position in front of the bundle receiver 140 to be engaged by the hooked end 151 of the slide 149. A lever 217 is pivotally mounted upon one side of the shock former and one arm of this lever is pivotally connected to the bar 215, as shown at 218, while another arm of the lever is connected to a sectional draw rod 219 connected to the arm 213. This draw rod 219 is made up of slidably connected members engaged by a cushioning spring 220 which retards the movement of the members outwardly relative to each other and is similar in construction to the cushioning members 190 and 191 hereinbefore described. A spring 221 is secured to the inner side of the bar 215 and bears against the inner portion of the bracket 214, thus to hold the hooked end 216 of the bar pressed outwardly into engagement with the hook 151 on slide 149. A hanger 222 extends downwardly from the back portion of the top plate 194 and is provided, at its lower end, and close to but above the gripping arms 212, with an arcuate abutment 223 which serves to bridge the space between the inner end portions of the gripping arms 212.

Heretofore in describing the various parts of the machine constituting the present invention, the normal positions of the parts have been set forth and in Figs. 1 to 6 inclusive of the drawings these normal positions have been illustrated. Assuming that the parts are all positioned as shown in said Figs. 1 to 6 inclusive, and that the present invention is connected to the side of and is moving forwardly with a harvester, then the operation will be as follows: Shafts 4 and 80 are continuously rotating and the gears 83, 88, 90, 91 and 111 are also continuously rotating. Each time a bundle is kicked out of the harvester by a well known mechanism which may be provided for that purpose, the sprocket 29 is rotated in one direction to turn the ratchet wheel 24 the distance of one notch after which said sprocket wheel 29 is moved back to its initial position as hereinbefore described. As each bundle is delivered from the harvester it gravitates along the inclined board 158 and is received by the bundle holder 140, the front end portion of the bundle engaging the toothed strip 159 and said bundle lying substantially parallel with the side of the holder 140. As the bundles are delivered successively from the harvester they will be piled in the receiver 140 and the parts are so timed that when a predetermined number of bundles have been delivered into the receiver 140, the tripping pin 26 will strike the crooked arm 19 and shift it and the bar 14 against the action of spring 32. This will bring the notch 17 in head 15 under lever 117, thus permitting said lever to shift relative to disk 114 and thereby cause spring 113' to throw the tooth 119 into engagement with teeth 113. This immediately couples the gear 111 to shaft 109 and said shaft is therefore rotated, the rear end of the pitman 120 moving downwardly and forwardly away from the head 34. Crank 110 pushes upwardly and forwardly through the pitman 120 against the yoke 126 and causes said yoke to tilt upwardly and forwardly, the segmental racks 142 and 143 rocking forwardly on the racks 121 and 123. During this tilting of the yoke 126 and the bundle holder or receiver 140, the rollers 136 are actuated in the manner hereinbefore described, so as to shift the gripping arms 128 inwardly. Consequently these arms will embrace the accumulated bundles and hold them together securely during the tilting of the bundle receiver 140.

During the upward or tilting movement of the receiver 140 the bundles are deposited with their butt ends lowermost, upon the tines 197 extending from the base strip 196 of the shock former. During the completion of this delivering action of the bundle receiver 140 the tripping finger 144 moves against the finger 54 so as thus to depress arm 52 (see Fig. 6) and cause the shaft 46 to rotate against the action of its spring 47. Consequently the hooked ends of the latch members 48 and 49 will be lifted out of the openings 199, thus releasing the shock former from the front ledge 41 of the main-frame. Likewise during the delivery movement of the bundle receiver 140, the stud 157' on the pawl 155 (see Fig. 10) slips under and past the tooth 154 on the slide 149 and assumes a position within the notch or recess 153.

A third operation takes place during the delivery action of the bundle receiver 140. It consists of the cam 157 pressing downwardly upon the finger 78 of lifting lever 76. Thus this lever is caused to push upwardly at its free end upon the forwardly projecting end of the shifting lever 97. Said lever 97 is therefore lifted over the shoulder 62 on the front beam 40 without, however, being lifted out of the notch 72, and spring 96 being thus released, pushes against the clutch member 95 and shifts the same into engagement with the clutch member 93. This action of spring 96 will also shift the lever 97 until it comes against the shoulders 75 and 61. As soon as the clutch members 95 and 93 are brought into engagement with each other, gear 91 becomes coupled to the shaft 89 and said shaft is therefore rotated by reason of the engagement of gear 91 with the rotating gear 88. This rotation of shaft 89 results in the transmission of motion through gears 108 and 173 to the post 172 and, consequently, the crane made up of the yoke 176 and the parts carried thereby is caused to swing forwardly and laterally away from the front of the bundle receiver or holder 140. As the crane starts this movement the bundle holder or receiver 140 begins to move back to its initial position, and when such position is reached, the rear end of the pitman 120 snaps past the ear 34 while the lever 117 strikes against the head 15, which, by this time, has been returned to its normal position by the spring 32. Thus lever 117 is actuated to uncouple the gear 111 from disk 114 and said gear 111 is therefore free to rotate without producing further rotation of shaft 109. During the beginning of the return movement of the bundle holder or receiver 140 the stud 157' on the pawl 155 pushes against the tooth 154 and pushes slide 149 rearwardly so that said slide thus pulls bar 215 and causes lever 217 to pull through the connection 219 upon arm 213. This will result in the rotation of shaft 201 and as the two shafts 200 and 201 are connected through the mutilated gears 202, it will be obvious that the two shafts 200 and 201 will be rotated simultaneously in opposite directions respectively, thus causing the arms 212 to embrace and bind upon the bundles standing on the tines 197. These arms will be locked in gripping position by the pawl 204 engaging the ratchet wheel 203.

As soon as the stud 157' slips past the tooth 154 during the backward or return movement of the bundle holder or receiver 140, the spring 152 will shift the slide 149 forwardly to its normal position. As the crane with the gripped and supported shock is swung forwardly and laterally relative to the main frame, the roller 180 connected to the carriage will travel upon the bearing or rail portion 165 of the table 164 and over the switch plate 168. As the roller reaches the outer end of the switch plate it will drop downwardly onto the lower end of the inclined portion 166 and simultaneously with this dropping of the roller the bottom of the shock former will be lowered so that the tines 197 will come close to or in contact with the ground. The butt ends of the bundles supported by the tines will come into engagement with the stubble upstanding from the ground, and, as the machine moves forward, the tines will be withdrawn from under the bundles. This withdrawal is permitted in view of the fact that, as soon as the shock former is dropped to the ground, the roller 209 is likewise engaged with the ground and causes the arm 207 to push rearwardly upon the arm 206. This will result in the pawl 204 being released from ratchet wheel 203 and the spring 211 which has been held under tension, will operate to swing the gripping arms 212 outwardly away from the shock.

As soon as the roller 180 drops over the end of the switch plate 168, the plate 175 on post 172 moves against the stud 69 and shifts it laterally so as to pull the bar 68 longitudinally. As this bar is connected by bolt 66 to the bar 65, it will be apparent that the shoulder 75 on head 70 will pull the forwardly projecting end of lever 97 laterally away from the beam 1 until it passes the shoulder 62 whereupon the spring 104 will shift the lug 102 downwardly into engagement with said shoulder 62 and thus lock lever 97 in the position shown in Fig. 2 and with the clutch member 95 out of engagement with the clutch member 93. During this sliding movement of the bar 65, the inclined bottom of the notch 73 will push upwardly upon the lever 107 and lift said lever above shoulder 59 so that spring 106 will thus be brought into play. This will result in the clutch member 105 being shifted into engagement with the clutch member 92 and, consequently, shaft 89 will be rotated in a direction opposite to that in which it has been previously driven. This will result in the gears 108 and 173 rotating the post 172 back toward its normal position. Consequently the shock former which has by this time been disengaged from the standing shock, will be swung back to its normal position as shown in full lines in Fig. 6, the hooks on the catches 48 and 49 springing into the openings 199 to automatically lock the shock former in position in front of the bundle receiver 140. As the shock former reaches this normal position, the plate 174 pushes against the stud 69 and thus shifts bars 68 and 65 toward the side beam 1. Thus shoulder 74 will push lever 107 back into engagement with its shoulder 59, this movement causing the clutch member 105 to shift out of engagement with the clutch member 92. Obviously, therefore, all of the parts will be reset and the operation hereinbefore described can then be repeated after a predetermined number of bundles have been deposited in the bundle receiver or holder 140. The rod 187 serves to hold the inner or rear ends of the tines 197 constantly in a line parallel with the front beam 40, as will be obvious.

It is to be understood of course, that during the return movement of the shock former to position in front of the bundle holder or receiver 140, the roller 180 movable with the carriage will travel upwardly along the inclined portion 166 of the table and will lift the switch plate 168 against the action of its spring 171 after which said roller will pass onto the bearing or rail portion 165 of the table.

What is claimed is:—

1. In a grain shocker, a bundle receiver, a shock former normally positioned in front thereof, and means controlled by the delivery of bundles to the receiver, for automatically tilting said receiver after a plurality of bundles have been discharged thereinto, thereby to deliver the bundles on end into the shock former.

2. In a grain shocker, a forwardly tiltable bundle receiver, a shock former normally positioned in front thereof to receive bundles therefrom, and means controlled by the delivery of bundles to the receiver for automatically tilting said receiver after a plurality of bundles have been discharged thereinto.

3. In a grain shocker, a shock former, a tiltable bundle receiver in rear thereof and adapted to deliver bundles on end into the former, and means controlled by the delivery of bundles to the receiver for automatically tilting said receiver to delivering position after a plurality of bundles have been discharged thereinto.

4. In a grain shocker, a shock former, a bundle receiver in rear of the former, means controlled by the delivery of bundles to the receiver for automatically tilting said receiver to deliver bundles on end into the former after a plurality of bundles have been discharged into the receiver, and transversely extending means within the receiver for engaging the bundles to prevent slipping during their discharge.

5. In a grain shocker, a shock former, a bundle receiver in rear of the former, means controlled by the delivery of bundles to the receiver for automatically tilting said receiver to deliver bundles on end into the former after a plurality of bundles have been discharged into the receiver, and transversely extending means within the receiver for engaging the bundles to prevent slipping during their discharge, said means being toothed.

6. In a grain shocker, a shock former, a bundle receiver, means controlled by the delivery of bundles to the receiver for automatically tilting said receiver to deliver the bundles therefrom on end into the former after a plurality of bundles have been discharged into the receiver, and means operated by the tilting movement of the receiver to and from delivery position for successively gripping and releasing the bundles on the receiver.

7. In a grain shocker, a shock former, and means for delivering bundles on end into said former, said means including a bundle receiver, means controlled by the delivery of bundles to the receiver for automatically tilting said receiver upwardly to delivery position after a plurality of bundles have been discharged into the receiver, and means operated during the tilting movement of said receiver to and from delivery position, for gripping and releasing bundles successively.

8. In a grain shocker, a shock former, and means for delivering bundles on end into said former, said means including a bundle receiver, means controlled by the delivery of bundles to the receiver for automatically tilting said receiver upwardly to delivery position after a plurality of bundles have been discharged into the receiver, and means operated during the tilting movement of said receiver to and from delivery position, for gradually gripping and quickly releasing the bundles during said movements respectively.

9. In a grain shocker a revoluble driving element, a driven element, a bundle receiver, means operated by the driven element during one complete rotation thereof, for successively tilting the bundle receiver to delivering position and returning said receiver to its normal position, a spring controlled coupling member revoluble with the driving element and normally engaging the driving element, a spring pressed slide normally in the path of said member, means engaging the driven element to hold it against reverse movement while the coupling member is in engagement with the slide and disengaged from the driving element, a ratchet wheel, means controlled by the delivery of bundles to the receiver for intermittently rotating said ratchet wheel, and means upon the ratchet wheel for engaging and shifting the slide once during the rotation of said wheel, thereby to release the coupling member, said slide being shiftable automatically into the path of said coupling member subsequent to the release of said coupling member.

10. In a grain shocker, a driven element, bundle controlled means for intermittently actuating the same, a receiver, a connection between said driven element and the receiver for successively tilting the receiver to delivery position and returning it to its normal position during each complete rotation of the driven element, oppositely disposed bundle gripping members carried by the receiver, and coöperating means upon said members and the connection between the receiver and the driving element for gradually moving said members toward each other to grip the bundles in the receiver and for suddenly disengaging said members from the bundles when the receiver reaches its discharging position.

11. In a grain shocker, a bundle receiver, a driving element, a connection between said driving element and the receiver for successively moving the receiver to dumping position and returning it to normal position during each complete rotation of the driven element, opposed bundle gripping devices carried by the receiver, diverging spreading elements upon said connection, and means carried by the gripping devices and guided by the spreading elements for gradually shifting said gripping devices toward each other during the movement of the receiver to discharging position and suddenly releasing said gripping devices upon the arrival of the receiver in dumping position.

12. In a grain shocker, a bundle receiver, a driving element, a connection between said driving element and the receiver for successively moving the receiver to dumping position and returning it to normal position during each complete rotation of the driven element, opposed bundle gripping devices carried by the receiver, diverging spreading elements upon said connection, and means carried by the gripping devices and guided by the spreading elements for gradually shifting said gripping devices toward each other during the movement of the receiver to discharging position and suddenly releasing said gripping devices upon the arrival of the receiver in dumping position, and means for automatically shifting the gripping devices apart when released.

13. In a grain shocker, a bundle receiver, means for swinging said receiver upwardly into and downwardly out of discharging position, toothed bundle engaging means extending transversely of the receiver, opposed bundle gripping devices carried by the receiver, and relatively movable coöperating means upon said gripping devices and the receiver for gradually shifting the gripping devices toward each other during the movement of the receiver to discharging position and suddenly releasing said gripping devices when the receiver is in discharging position.

14. In a grain shocker, a bundle receiver, means for swinging said receiver upwardly into and downwardly out of discharging position, toothed bundle engaging means extending transversely of the receiver, opposed bundle gripping devices carried by the receiver, and relatively movable coöperating means upon said gripping devices and the receiver for gradually shifting the gripping devices toward each other during the movement of the receiver to discharging position and suddenly releasing said gripping devices when the receiver is brought to discharging position, and means for automatically returning the gripping devices to their normal positions when released.

15. In a grain shocker, a bundle receiver, means for swinging said receiver to discharge bundles therefrom with their butt ends lowermost, the receiver having opposed slots in the sides and bottom thereof, bundle gripping arms normally seated within the slots and loosely embracing the inner side walls thereof, wings depending from the arms, roller carrying members movably mounted within the wings, yieldable means connecting said members for holding the arms normally seated in the slots and for holding said roller carrying members normally in predetermined positions relative to each other, and means coöperating with the roller carrying members for gradually shifting the arms toward each other to compress bundles within the receiver during the movement of the receiver toward its discharging position, and for quickly releasing said arms when the receiver reaches its discharging position.

16. In a grain shocker, a receiver tiltably mounted, gripping arms carried thereby, said arms being fulcrumed upon the receiver, means connected to the bottom portion of the receiver for swinging said receiver into and out of discharging position, diverging spreading devices carried by said means, wings depending from the arms, members revolubly mounted upon the respective wings, a spring connection between said members for holding them normally in predetermined positions, and for holding the arms out of active positions, said members being movable along the spreading devices during the movement of the receiver to discharging position, for shifting the gripping arms gradually toward each other, the spring connection between the members operating to turn said members and the arms to their normal positions when the members are disengaged from the spreading devices.

17. In a grain shocker, a shock former mounted for lateral swinging movement, a bundle receiver, means for tilting the receiver to deposit bundles with their butt ends lowermost within the shock former, oppositely rotating drive elements, means for swinging the shock former laterally toward or from the receiver, means operated by the receiver when brought to tilting position, for coupling said operating means to one of the driving elements thereby to swing the shock former away from the receiver, and means operated by the shock former when brought to the limit of said movement for automatically returning the shock former to position adjacent the receiver.

18. In a grain shocker, the combination with a bundle receiver mounted to swing about a horizontal axis and means for swinging said receiver to discharge a plurality of bundles with their butt ends lowermost, of a shock former, means for locking the shock former in position to receive the plurality of bundles from the receiver, and means operated by the movement of the receiver to delivering position for unlocking the shock former.

19. In a grain shocker, a bundle receiver mounted to swing about a horizontal axis means for swinging said receiver to deliver a plurality of bundles with their butt ends lowermost, a shock former, a spring controlled latch for engaging the shock former to hold it in position to receive the discharged bundles from the receiver, and means operated by the receiver during its movement to discharging position, for automatically shifting the latch against the action of the spring to release the shock former.

20. In a grain shocker, a bundle receiver, means for swinging the receiver to discharge the bundles with their butt ends lowermost, a shock former, a spring controlled rock shaft, latch members extending from the shaft and adapted to automatically engage the shock former to hold it in position to receive the discharged bundles, depressible means connected to the rock shaft, and means operated by the movement of the bundle receiver to discharging position, for actuating said depressible means and simultaneously disengaging the latches from the shock former.

21. In a grain shocker, the combination with a main structure including a ledge, a bundle receiver, and means for swinging said receiver to discharge bundles therefrom with their butt ends lowermost, of a shock former normally lapping and bearing upon the ledge in position to receive the discharged bundles, a latch member for automatically engaging the shock former to hold it upon the ledge, and means operated by the movement of the bundle receiver to discharging position for disengaging the latch from the shock former.

22. In a grain shocker, the combination with a bundle receiver, and means for swinging the receiver to discharge bundles therefrom with their butt ends lowermost, of a shock former in front of the receiver and including a crane mounted for lateral swinging, means for actuating the crane, shock supporting means suspended from the crane, a driving element, and means operated by the movement of the bundle receiver to discharging position for coupling said driving element to the crane operating means.

23. In a grain shocker, a crane mounted for lateral swinging, a shock former suspended from the crane, means for actuating the crane, oppositely rotating driving elements, a bundle receiver, means for swinging said receiver to direct bundles with their butt ends lowermost into the shock former, means operated by the movement of the bundle receiver to discharging position, for coupling one of the driving elements to the crane operating means, and means operated by the movement of the shock former and crane away from receiving position for automatically uncoupling said driving element from the crane operating means and coupling the other driving element to said crane operating means.

24. In a grain shocker, a crane, means for swinging the crane laterally, a shock former suspended from the crane, a driving element, a bundle receiver, means for swinging said receiver to discharge bundles with their butt ends lowermost into the shock former, means operated by the movement of the bundle receiver to discharging position for coupling the driving element to the crane actuating means, shock gripping means carried by the shock former, and means for automatically actuating said gripping means during the movement of the shock former away from the receiver, to bind upon the supported shocks.

25. A grain shocker including a shock former, means for swinging said shock former laterally into and out of normal position, a bundle receiver, means for swinging the bundle receiver to discharge bundles with their butt ends lowermost into the shock former, while said shock former is in its normal position, a driving element, means operated by the movement of the bundle receiver to delivering position for coupling said driving element to the actuating means of the shock former, shock gripping means carried by the shock former, means operated by the relative movement of the shock former and bundle receiver for shifting said means into engagement with a shock, and means for holding the shock gripping means in active position.

26. In a grain shocker, a shock former, a bundle receiver, means for swinging the bundle receiver to deliver bundles with their butt ends lowermost into the shock former, means controlled by the movement of the bundle receiver to discharging position for swinging the shock former laterally away from the bundle receiver, shock gripping means carried by the shock former, means operated by said movement of the shock former relative to the bundle receiver for actuating the shock gripping means, and means for automatically locking the shock gripping means in active position.

27. In a grain shocker, a shock former, means for supporting the shock former above the ground, a bundle receiver, means for swinging said receiver to discharge bundles with their butt ends lowermost into the shock former, means controlled by the movement of the bundle receiver to discharging position for shifting the shock former away from the receiver, said supporting means operating to lower the shock former when brought to a predetermined position during such movement away from the receiver, shock gripping devices carried by the shock former, means operated by the movement of the shock former relative to the bundle receiver for shifting said shock gripping devices into active positions, means for automatically locking the shock gripping devices in active positions, and means operated by the lowering of the shock former for releasing said gripping devices.

28. In a grain shocker, a shock former, means for supporting the shock former above the ground, a bundle receiver, means for swinging said receiver to discharge bundles with their butt ends lowermost into the shock former, means controlled by the movement of the bundle receiver to discharging position for shifting the shock former away from the receiver, said supporting means operating to lower the shock former when brought to a predetermined position during such movement away from the receiver, shock gripping devices carried by the shock former, means operated by the movement of the shock former relative to the bundle receiver for shifting said shock gripping devices into active positions, means for automatically locking the shock gripping devices in active positions, means operated by the lowering of the shock former for releasing said gripping devices, and means for automatically returning the gripping devices to their normal positions within the shock former when they are released.

29. In a grain shocker, the combination with a bundle receiver and means for tilting the same to deliver bundles therefrom with their butt ends lowermost, of a shock former having a bottom made up of tines extending rearwardly, means for swinging the shock former laterally away from the bundle receiver, a continuously rotating driving element, means operated by the movement of the bundle receiver to delivering position for coupling said driving element to the shock former swinging means, a spring controlled hooked element supported adjacent the bundle receiver, a pair of opposed shock gripping devices carried by the shock former, a hooked element movably connected to said devices and adapted to engage the first mentioned hooked element when the shock former is in receiving position, and means operated by the bundle receiver during its movement to normal position for shifting said first mentioned hooked element to pull upon the hooked element on the shock former during the movement of said shock former away from the bundle receiver.

30. A grain shocker including a shock former, a bundle receiver, means for swinging the bundle receiver to deliver bundles with their butt ends lowermost into the shock former, gripping arms carried by the shock former, actuating means for swinging the shock former away from the bundle receiver, a continuously rotating driving element, means operated by the movement of the bundle receiver in one direction for coupling said driving element to the operating means, and detachably connected interengaging means adjacent the bundle receiver and upon the shock former respectively for shifting the gripping arms to bind upon and support a shock upon the former during the movement of said former away from the bundle receiver.

31. In a grain shocker, the combination with a bundle receiver and means for swinging said receiver to deliver bundles therefrom with their butt ends lowermost, of a shock former normally positioned to receive the discharged bundles, shock gripping arms upon the former, interengaging coöperating means upon the shock former and adjacent the bundle receiver respectively, and actuated by the movement of the bundle receiver away from discharging position, for shifting the gripping arms into engagement with a shock in the former, a driving element, power transmitting means, and means operated by the movement of the bundle receiver for coupling said driving element to the power transmitting means to shift the shock former relative to the bundle receiver and disengage the interfitting means.

32. In a grain shocker, the combination with a bundle receiver and means for swinging said receiver to deliver bundles therefrom with their butt ends lowermost, of a shock former normally positioned to receive the discharged bundles, shock gripping arms upon the former, interengaging coöperating means upon the shock former and adjacent the bundle receiver respectively, and actuated by the movement of the bundle receiver away from discharging position, for shifting the gripping arms into engagement with a shock in the former, a driving element, power transmitting means, and means operated by the movement of the bundle receiver for coupling said driving element to the power transmitting means to shift the shock former relative to the bundle receiver and disengage the interfitting means, and means for locking the shock gripping arms in engaging position.

33. The combination with a bundle receiver and means for swinging the same to deliver bundles forwardly therefrom with their butt ends lowermost, of a shock former normally positioned in front of the bundle receiver to receive the bundles therefrom, a continuously rotating driving element, power transmitting mechanism for swinging the shock former laterally relative to the bundle receiver, means controlled by the movement of the bundle receiver for coupling said driving element to and uncoupling it from the power transmitting mechanism, and means for maintaining the shock former constantly at the same angle to the front end of the bundle receiver during the movement of the shock former relative to the bundle receiver.

34. In a grain shocker, the combination with a bundle receiver mounted to swing about a transverse axis, and means for swinging the same forwardly about said axis to deliver a plurality of bundles therefrom, of a shock former normally in front of the receiver to receive the bundles, means for swinging the shock former laterally relative to the bundle receiver, and means for maintaining the shock former constantly at the same angle to the front of the bundle receiver during such movement.

35. In a grain shocker, a bundle receiver, means for swinging the same to deliver bundles therefrom with their butt ends lowermost, a shock former normally positioned to receive the discharged bundles and support them on end, means for normally supporting the shock former out of contact with the ground, the shock former having tines constituting the bottom thereof, means for swinging the shock former laterally relative to and off of the supporting means to deposit the shock former upon the ground, and means for maintaining the shock former constantly at the same angle to the front of the bundle receiver during such movement of the shock former.

36. The combination with a movably supported bundle receiver and means for swinging said receiver to deliver bundles forwardly therefrom with their butt ends lowermost, of a shock former normally positioned in front of the receiver to receive the bundles therefrom and support them in standing position, said shock former having tines constituting the bottom thereof and extended oppositely to the direction of movement of the shocker, means controlled by the movement of the bundle receiver for swinging the shock former laterally away from and toward the bundle receiver, and means for maintaining the tines of the shock former constantly parallel with the path of movement of the shocker.

37. A grain shocker mounted for forward movement and including a bundle receiver, means for actuating the receiver to discharge bundles forwardly therefrom with the butt ends lowermost, a shock former normally positioned in front of and adapted to receive bundles from said receiver, said former having tines constituting the bottom thereof, said tines being extended rearwardly, means for supporting the shock former off of the ground, means controlled by the movement of the bundle receiver for swinging the shock former laterally relative to the bundle receiver and off of said supporting means to deposit the tines upon the ground, and means for maintaining the tines constantly parallel with the path of movement of the shocker.

38. A grain shocker including a forwardly movable structure, a bundle receiver carried thereby, means for swinging the receiver to discharge bundles forwardly therefrom with their butt ends lowermost, a shock former normally positioned in front of the receiver to receive bundles therefrom, said shock former having tines constituting the bottom thereof, said tines being extended rearwardly, shock gripping devices carried by the shock former, means controlled by the movement of the bundle receiver to discharging position for swinging said former laterally away from the bundle receiver, means operated by the relative movement of the shock former and the first mentioned structure for shifting the gripping devices into engaging positions, means for supporting the shock former out of contact with the ground for a portion of its movement away from the bundle receiver and for releasing said shock former to deposit its tines upon the ground upon the completion of such movement in one direction, and means operated by the movement of the shock former into contact with the ground for releasing the gripping devices.

39. In a grain shocker a vertically movable crane, a support therefor, a shock former suspended from the crane and having rearwardly extending tines constituting the bottom thereof, means for delivering bundles with their butt ends lowermost upon the tines, means controlled by said delivering means for swinging the crane relative to and off of the support to deposit the shock former upon the ground, means for automatically reversing the movement of the crane, means for guiding said crane during such reverse movement upwardly onto the support to lift the shock former off of the ground, and means for maintaining the shock former at a predetermined angle to the bundle delivering means at all times during said movement of the shock former.

40. In a grain shocker a vertically movable crane, a support therefor, a shock former suspended from the crane and having rearwardly extending tines constituting the bottom thereof, means for delivering bundles with their butt ends lowermost upon the tines, means controlled by said delivering means for swinging the crane relative to and off of the support to deposit the shock former upon the ground, means for automatically reversing the movement of the crane, means for guiding said crane during such reverse movement upwardly onto the support to lift the shock former off of the ground, shock gripping arms movably supported by the shock former, means operated by the bundle delivering means for shifting said arms into engagement with the shock in the former, means for locking the arms in engaging position, and means operated by the lowering of the shock former onto the ground for releasing the arms.

41. In a grain shocker a vertically movable crane, a support therefor, a shock former suspended from the crane and having rearwardly extending tines constituting the bottom thereof, means for delivering bundles with their butt ends lowermost upon the tines, means controlled by said delivering means for swinging the crane relative to and off of the support to deposit the shock former upon the ground, means for automatically reversing the movement of the crane, means for guiding said crane during such reverse movement upwardly onto the support to lift the shock former off of the ground, shock gripping arms movably supported by the shock former, means operated by the bundle delivering means for shifting said arms into engagement with the shock in the former, means for locking the arms in engaging position, and means operated by the lowering of the shock former onto the ground for releasing the arms, and means for automatically returning the arms to their initial positions when released.

42. The combination with a revoluble crane, a shock former suspended therefrom, and a means for delivering bundles onto the shock former, of a shaft for rotating the same, oppositely revoluble drive elements fixed upon the shaft, a spring controlled clutch member shiftable into engagement with each of said drive elements, a lever coöperating with each clutch member for holding it against the action of the spring and out of engaging position, separate means for engagement by the respective levers for holding said levers against movement, means operated by the bundle delivering means for disengaging one of said levers to release the clutch controlled thereby and to couple one of the driving elements to the shaft, thereby to move the crane in one direction, and means operated by the crane when reaching one limit of its movement, for resetting said clutch and its lever and releasing the other lever and its clutch, thereby to reverse the movement of the crane.

43. In a grain shocker, the combination with a revoluble crane including a post, and a shock former suspended from the crane, of means for delivering bundles onto the shock former, a shaft for rotating the crane, oppositely revoluble drive elements loose upon the shaft, clutch members keyed on the shaft for engaging the respective drive elements, levers for holding the clutch members out of engaging position, means for engagement by the levers for holding the said levers against movement while the clutch members are out of engaging positions, means operated by the bundle delivering means for automatically disengaging one of the levers from its holding means, thereby to couple one of the driving elements to the shaft to swing the same in one direction, and means operated by the crane when reaching the limit of its movement for resetting the said lever and its clutch and successively releasing and resetting the other lever and its clutch member, thereby to reverse the movement of the crane.

44. A grain shocker including a bundle receiver, means for swinging the same to deliver bundles with their butt ends lowermost, means operated by the movement of the bundle receiver for successively gripping the bundles during their movement to discharging position and releasing the bundles, a shock former for receiving the released bundles and supporting them upon their butt ends, means carried by the shocker for gripping the bundles therein, means controlled by the bundle receiver for shifting the shock former laterally from the receiver and depositing it upon the ground, and means operated by the movement of the shock former toward the ground for releasing the shock gripping means.

45. A grain shocker including a bundle receiver, means for swinging the same to deliver bundles with their butt ends lowermost, means operated by the movement of the bundle receiver for successively gripping the bundles during their movement to discharging position and releasing the bundles, a shock former for receiving the released bundles and supporting them upon their butt ends, means carried by the shocker for gripping the bundles therein, means controlled by the bundle receiver for shifting the shock former laterally from the receiver and depositing it upon the ground, and means operated by the movement of the shock former toward the ground for releasing the shock gripping means, and means for maintaining the shock former constantly at a predetermined angle relative to the bundle receiver.

46. A grain shocker including a bundle receiver, a driving element, means for automatically coupling the driving element to the bundle receiver for swinging the receiver after a predetermined number of bundles have been discharged thereinto, thereby to deliver bundles butt ends lowermost from the receiver, a shock former adapted to receive the delivered bundles, means for automatically gripping the bundles in the shock former upon the completion of the discharge of bundles into the shock former, means controlled by the bundle receiver for shifting the shock former laterally from said receiver and depositing it on the ground and for returning the shock former to receiving position, and means operated by the lowering of the shock former onto the ground for releasing the bundle gripping means carried by the shock former.

47. A grain shocker including a forwardly moving frame, a bundle receiver carried thereby, means for directing bundles one at a time into the receiver, means for automatically swinging said receiver after a predetermined number of bundles have been delivered thereto, to discharge the bundles forwardly with their butt ends lowermost, a shock former normally positioned in front of the receiver to receive said bundles, bundle gripping devices carried by the shock former, means controlled by the movement of the bundle receiver for shifting the shock former laterally away from the receiver, depositing it upon the ground, and returning the shock former to position out of contact with the ground and in front of the bundle receiver, means operated by the movement of the shock former relative to the bundle receiver for shifting the bundle gripping devices into bundle engaging position, and means operated by the movement of the shock former into engagement with the ground for releasing said gripping devices.

48. A grain shocker including a forwardly moving frame, a bundle receiver carried thereby, means for directing bundles one at a time into the receiver, means for automatically swinging said receiver after a predetermined number of bundles have been delivered thereto, to discharge the bundles forwardly with their butt ends lowermost, a shock former normally positioned in front of the receiver to receive said bundles, bundle gripping devices carried by the shock former, means controlled by the movement of the bundle receiver for shifting the shock former laterally away from the receiver, depositing it upon the ground, and returning the shock former to position out of contact with the ground and in front of the bundle receiver, means operated by the movement of the shock former relative to the bundle receiver for shifting the bundle gripping devices into bundle engaging position, means operated by the movement of the shock former into engagement with the ground for releasing said gripping devices, and means for maintaining the shock former constantly at the same angle to the direction of movement of the supporting structure.

49. A grain shocker including a forwardly moving frame, a bundle receiver carried thereby, means for directing bundles one at a time into the receiver, means for automatically swinging said receiver after a predetermined number of bundles have been delivered thereto, to discharge the bundles forwardly with their butt ends lowermost, a shock former normally positioned in front of the receiver to receive said bundles, bundle gripping devices carried by the shock former, means controlled by the movement of the bundle receiver for shifting the shock former laterally away from the receiver, depositing it upon the ground, and returning the shock former to position out of contact with the ground and in front of the bundle receiver, means operated by the movement of the shock former relative to the bundle receiver for shifting the bundle gripping devices into bundle engaging position, and means operated by the movement of the shock former into engagement with the ground for releasing said gripping devices, there being tines constituting the bottom of the shock former, and means for maintaining the tines constantly parallel with the direction of movement of the supporting structure, said tines being extended rearwardly within the shock former.

50. In a grain shocker, the combination with a main supporting structure, of a bundle receiver, means for delivering bundles thereto, means for automatically swinging said receiver to deliver the bundles therefrom after a predetermined number of bundles have been discharged into the receiver, a shock former, means for securing said shock former in position in front of the receiver to receive the delivered bundles therefrom, bundle gripping devices upon the shock former, means controlled by the movement of the bundle receiver into and out of delivering position for successively releasing the shock former, moving it laterally from the receiver, depositing it upon the ground, returning it to delivery position in front of the bundle receiver and resecuring it in such position.

51. In a grain shocker, the combination with a main supporting structure, of a bundle receiver, means for delivering bundles thereto, means for automatically swinging said receiver to deliver the bundles therefrom after a predetermined number of bundles have been discharged into the receiver, a shock former, means for securing said shock former in position in front of the receiver to receive the delivered bundles therefrom, bundle gripping devices upon the shock former, means controlled by the movement of the bundle receiver into and out of delivering position for successively releasing the shock former, moving it laterally from the receiver, depositing it upon the ground, returning it to delivery position in front of the bundle receiver and resecuring it in such position, means operated by the movement of the shock former relative to the receiver for shifting the gripping devices into active positions, and means operated by the downward movement of the shock former onto the ground for releasing said devices from their active positions.

52. In a grain shocker, the combination with bundle receiving and delivering means, of a shock former normally positioned in front thereof to receive the delivered bundles and support them on end, means operated by the movement of the bundle receiving and delivering means for successively shifting the shock former laterally from said receiving and delivering means, depositing the shock former upon the ground, and returning the shock former to its initial position, said shock former having rearwardly extending shock supporting tines.

53. In a grain shocker, the combination with bundle receiving and delivering means, of a shock former normally positioned in front thereof to receive the delivered bundles and support them on end, means operated by the movement of the bundle receiving and delivering means for successively shifting the shock former laterally from said receiving and delivering means, depositing the shock former upon the ground, and returning the shock former to its initial position, said shock former having rearwardly extending shock supporting tines, and means for maintaining the tines constantly parallel with the direction of movement of the shocker.

54. In a grain shocker, the combination with bundle receiving and delivering means, of a shock former normally positioned in front thereof to receive the delivered bundles and support them on end, means operated by the movement of the bundle receiving and delivering means for successively shifting the shock former laterally from said receiving and delivering means, depositing the shock former upon the ground, and returning the shock former to its initial position, said shock former having rearwardly extending shock supporting tines, and means for maintaining the tines constantly parallel with the direction of movement of the shocker, shock gripping arms movably supported by the former, means operated by the movement of the shock former relative to the bundle receiving and delivering means for shifting the said arms into engagement with the bundle supported in the former, means for automatically locking said arms in gripping positions, and means operated by the downward movement of the shock former into engagement with the ground for releasing said arms.

55. In a grain shocker, the combination with bundle receiving and delivering means, of a shock former normally positioned in front thereof, to receive the delivered bundles and support them on end, means operated by the movement of the bundle receiving and delivering means for successively shifting the shock former laterally from said receiving and delivering means, depositing the shock former upon the ground, and returning the shock former to its initial position, said shock former having rearwardly extending shock supporting tines, and means for maintaining the tines constantly parallel with the direction of movement of the shocker, shock gripping arms movably supported by the former, means operated by the movement of the shock former relative to the bundle receiving and delivering means for shifting the said arms into engagement with the bundles supported in the former, means for automatically locking said arms in gripping positions, and means operated by the downward movement of the shock former into engagement with the ground for releasing said arms, and means for automatically returning the released arms to initial position.

In testimony that I claim the foregoing as my own, I have hereto affixed my signature in the presence of two witnesses.

CHARLES CISSNER.

Witnesses:
E. E. CLAUSEN,
J. R. CLAUSEN.

Copies of this patent may be obtained for five cents each, by addressing the "Commissioner of Patents, Washington, D. C."